US012632484B2

(12) United States Patent
Zamir et al.

(10) Patent No.: US 12,632,484 B2
(45) Date of Patent: May 19, 2026

(54) OFFLINE AUTHORIZATION EVALUATION REQUEST

(71) Applicant: Dell Products L.P., Round Rock, TX (US)

(72) Inventors: Amos Zamir, Beer Sheva (IL); Stav Sapir, Beer Sheva (IL); Igor Dubrovsky, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/624,510

(22) Filed: Apr. 2, 2024

(65) Prior Publication Data

US 2025/0307294 A1 Oct. 2, 2025

(51) Int. Cl.
| | |
|---|---|
| *G06F 16/00* | (2019.01) |
| *G06F 16/332* | (2019.01) |
| *G06F 16/338* | (2019.01) |
| *G06F 16/387* | (2019.01) |
| *G06F 16/9535* | (2019.01) |
| *H04L 9/40* | (2022.01) |

(52) U.S. Cl.
CPC .......... *G06F 16/338* (2019.01); *G06F 16/332* (2019.01); *G06F 16/387* (2019.01); *G06F 16/9535* (2019.01); *H04L 63/20* (2013.01)

(58) Field of Classification Search
CPC .................................................. G06F 16/9535
See application file for complete search history.

(56) References Cited

U.S. PATENT DOCUMENTS

| | | | |
|---|---|---|---|
| 2015/0222759 A1* | 8/2015 | Baker | ................ G06Q 20/3224 |
| | | | 455/405 |
| 2016/0277378 A1* | 9/2016 | Balasubramanian | ........................ |
| | | | H04L 63/105 |

* cited by examiner

*Primary Examiner* — Ajith Jacob
(74) *Attorney, Agent, or Firm* — Workman Nydegger

(57) ABSTRACT

Techniques for enforcing policy at a collection level are disclosed. A service receives, from a requesting entity, a set of search parameters to query a database of information. The service sends the search parameters to an authorization service, which is tasked with enforcing a collection level policy for the requesting entity by generating a set of local conditions that are injectable into a query submitted to the database. The service receives, from the authorization service, the set of local conditions. The service generates the query using a combination of the search parameters and the local conditions. The service facilitates execution of the query against the database. The service returns results of the executed query to the requesting entity. The results are organized using pages.

20 Claims, 4 Drawing Sheets

300

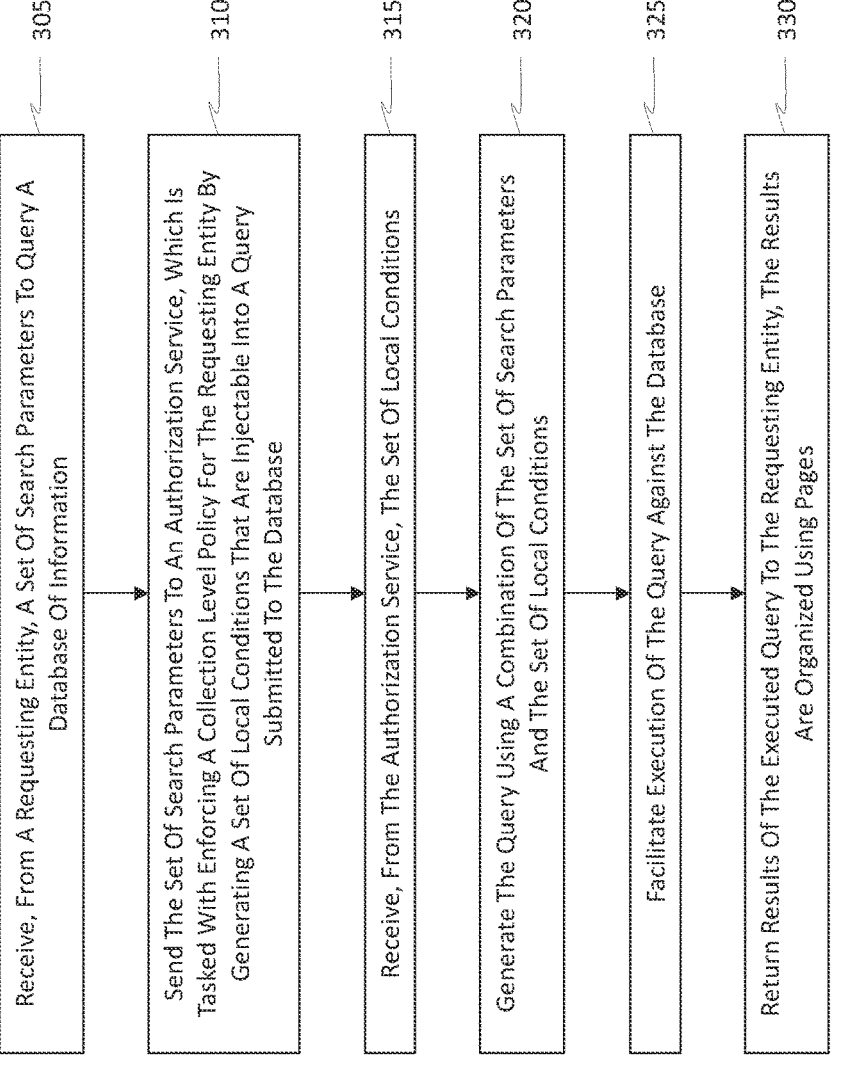

305

Receive, From A Requesting Entity, A Set Of Search Parameters To Query A Database Of Information

310

Send The Set Of Search Parameters To An Authorization Service, Which Is Tasked With Enforcing A Collection Level Policy For The Requesting Entity By Generating A Set Of Local Conditions That Are Injectable Into A Query Submitted To The Database

315

Receive, From The Authorization Service, The Set Of Local Conditions

320

Generate The Query Using A Combination Of The Set Of Search Parameters And The Set Of Local Conditions

325

Facilitate Execution Of The Query Against The Database

330

Return Results Of The Executed Query To The Requesting Entity, The Results Are Organized Using Pages

*Figure 3*

OFFLINE AUTHORIZATION EVALUATION REQUEST

COPYRIGHT AND MASK WORK NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

TECHNOLOGICAL FIELD OF THE DISCLOSURE

Embodiments disclosed herein generally relate to enforcing policy against query results. More particularly, at least some embodiments relate to systems, hardware, software, computer-readable media, and methods for enforcing policy at a query result collection level as opposed to a per individual query result level.

BACKGROUND

Traditional access control mechanisms rely on the Policy Decision Point (PDP) to make authorization decisions based on predefined policies and to return a binary outcome of either granted or denied access. As the complexity of applications and data environments continues to grow, however, there is a need for a more flexible and dynamic approach to access control.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

FIG. 3 illustrates a flowchart of an example method for enforcing policy at a collection level.

DETAILED DESCRIPTION

Figure 1:
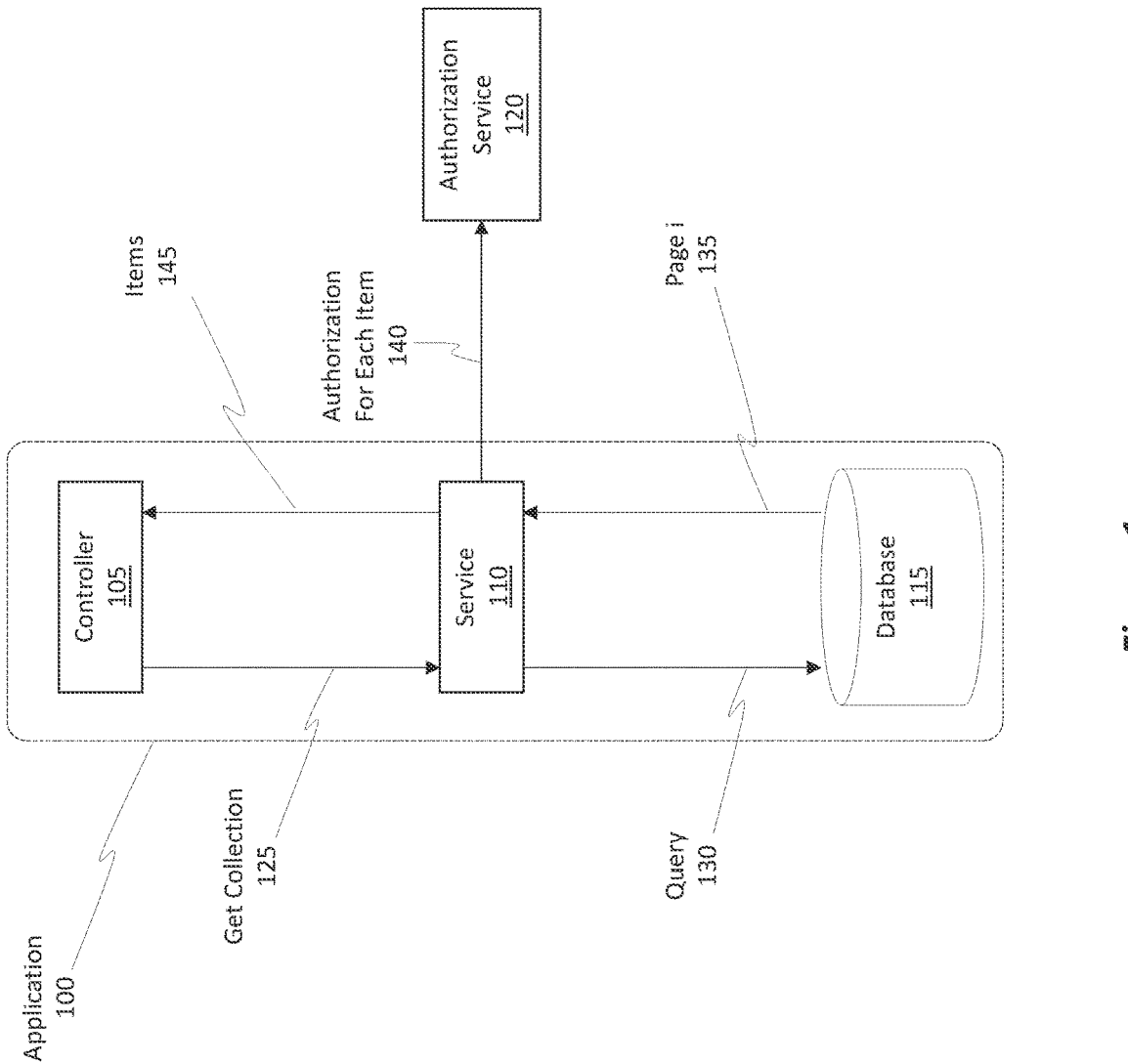
FIG. 1 illustrates an example architecture for enforcing policy per each result.

Traditional access control mechanisms rely on the Policy Decision Point (PDP) to make authorization decisions based on predefined policies and to return a binary outcome of either granted or denied access. As the complexity of applications and data environments continues to grow, however, there is a need for a more flexible and dynamic approach to access control.

The disclosed embodiments provide solutions to those needs. In particular, the embodiments bring about numerous benefits, advantages, and practical applications to implementing policy so as to grant authorization regarding query results. As one example benefit, the embodiments provide a unique and beneficial approach to performing authorization decisions by extending the role of the authorization server beyond just simple decision-making. Beneficially, the embodiments empower the authorization server to provide a so-called "conditions" structure that can be integrated into the queries of an application's database. Moreover, the conditions returned by the authorization server are closely coupled to the policy that was evaluated to the grant or deny decision.

The disclosed embodiments aim to enhance the authorization process by enabling the authorization server to not only determine access rights but to also generate conditions that are incorporated into the application's data retrieval queries. This approach ensures that the granted access aligns with specific conditions or constraints defined by the authorization policies, thereby enabling finer-grained control over data access.

As another advantage, the authorization server is now able to generate the condition's structure in a dynamic manner based on various authorization policies, user attributes, and contextual information, while also associating the condition's structure with the policy that led to the grant or deny decision. This structure is then passed to the application layer, where it is incorporated into the database queries to filter and to modify the result set based on the access rights and conditions.

In this regard, the embodiments are beneficially able to construct conditioning based on a given context. The embodiments bring about dynamic environmental conditioning that can be driven by policy. The disclosed solutions also relate to a generic offline authorization evaluation method that is not tightly coupled with a specific policy engine language or implementation. That is, the disclosed embodiments enable a generic framework for conditioning and filtering that is not bound to a specific database syntax or structure.

The disclosed techniques beneficially improve security, reduce complexity in managing access policies, and enhance data protection. By coupling the conditions with the policy, organizations gain a clear understanding of the reasons behind the access decision and can enforce policy compliance more effectively. With the integration of condition-based database queries, organizations can ensure that data is accessed and manipulated only under specific conditions, thereby preventing unauthorized or inappropriate access. Additionally, the generic nature of the disclosed techniques allows for easy integration with existing applications, minimizing the need for extensive modifications and making these techniques suitable for real-world deployment.

In this manner, the disclosed dynamic authorization decision framework provides a unique solution that enhances access control by incorporating condition-based database queries. By extending the role of the authorization server and by enabling the authorization server to generate conditions dynamically, coupled with the policy that was evaluated to make a decision, the embodiments offer a more flexible and finer-grained approach to access control. This framework addresses the growing complexity of access control requirements and provides organizations with a powerful tool to ensure secure and controlled data access in diverse application environments, while maintaining transparency and accountability in the authorization process. Accordingly, these and numerous other benefits will now be described in more detail throughout the remaining sections of this disclosure.

Authorization Decision Points

Various options exist to perform authorization. One technique is a "Policy Enforcement Point" (PEP) technique. PEPs are responsible for enforcing policies related to access control decisions. PEPs receive requests from users seeking access to protected resources and to make authorization decisions based on the user's attributes and the applicable policies.

Another technique is a "Policy Decision Point" (PDP) technique. The primary responsibility of a PDP is to evaluate the user's attributes and to determine whether they meet the requirements specified in the applicable policies. Based on this evaluation, the PDP makes an authorization decision, which can include granting or denying access to protected resources.

Another technique is a "Policy Information Point" (PIP) technique. PIPs are responsible for providing relevant information about policies and other factors that influence authorization decisions. PIPs store and manage policy documents, as well as any other data required by PEPs and PDPs to make informed decisions. In some cases, PIPs may also actively communicate with other components in the system to ensure consistent policy enforcement across all services.

A "Policy Administration Point" (PAP) refers to any component within an Identity Management system that handles tasks related to creating, updating, and maintaining policies governing user access and resource protection. These tasks may include managing policy documents, distributing updates or changes to relevant decision points, and monitoring policy enforcement across the system.

A "Policy Retrieval Point" (PRP) refers to any component within an Identity Management system responsible for storing and managing policy documents, which define rules and conditions governing user access and resource protection. These policies can include permissions, authentication requirements, and other security-related settings.

Another technique is referred to as "Role-Based Access Control" (RBAC). This technique describes a security model that restricts system access based on job functions or roles within an organization. In this approach, users are assigned permissions based on their roles rather than on individual capabilities. Doing so helps in managing user privileges more effectively while minimizing the risk of unauthorized access or misuse of resources. RBAC can be implemented at various levels, such as for entire organizations, departments, or even specific applications. By assigning appropriate permissions to each role, RBAC ensures that users have access only to the resources necessary for them to perform their job duties.

An "Attribute-Based Access Control" (ABAC) technique refers to a security model that evaluates whether a subject (e.g., a user or system) should be granted access to a resource based on attributes associated with both the subject and the resource. In ABAC, rules are defined using a set of attributes, such as user ID, group membership, time of day, location, and other contextual factors. These rules determine whether access should be allowed or denied by comparing the attributes of the subject and the resource. If the rule conditions are met, access is granted; otherwise, access is denied.

Unlike role-based access control, which relies on predefined roles for users within an organization, attribute-based access control allows for finer-grained authorization decisions. This can help organizations better manage access to sensitive resources while minimizing the risk of unauthorized access or misuse. ABAC can also support dynamic policies that adapt to changing circumstances or events in real time.

Some services enforce policy at the level of a single resource. To perform enforcement, a decision is made based on the request context. The decision might be more complex than regular RBAC, however. For example, in ABAC, it is possible to introduce policies based on attributes on the actual data instances or records. This might lead to some performance issues and business requirements challenges, however.

Consider an example involving pagination. Pagination generally involves the practice of obtaining results and organizing them into pages as opposed to obtaining all of the results at once. Often, pagination is implemented when a user interface is involved. For instance, the user interface provides options to allow a user to navigate to different pages showing the various query results as opposed to showing a single window with all of the results. Pagination is typically the strategy used when a query is submitted to a database that includes many records, often much more than a few hundred records.

One issue with pagination is that the query will pull all the resources without first considering the authorization rules. For systems that use pagination, those systems apply the authorization rules after the query is performed. Doing so, however, leads to problems because the objects that were pulled might then be filtered out and might cripple the number of objects per page that will be returned upstream.

To elaborate on this example, assume a system includes a service for viewing books. Each county has a different content policy based on different criteria (e.g., violence, sexual content, score thresholds, etc.). In this example, it is desirable to enforce the policy using the authorization service.

The attributes for consideration include the geo-location and the minimum age allowed to expose violence or adult content. In such a scenario, if the user is asking to see all the books that started with the keywords "fight," then there could be many books that satisfy the query, and the system would pull the list of books using a pagination (e.g., by pulling only the first 20 items according to the pagination rules). Now, consider a scenario where the user is 13 years old and is located in China. Under these conditions, content, such as violence, will not be allowed according to the associated policy. Performing the filtering operation after the items are pulled from the database might return only one item per page (upstream). FIG. 1 is illustrative of this scenario.

FIG. 1 shows an example scenario involving an application 100. Application 100 is shown as including a controller 105, a service 110, and a database 115. Application 100 also communicates with an authorization service 120.

In some implementations, controller 105 may be an application programming interface (API) for application 100. Service 110 can be the backend logic for application 100. Database 115 is a repository that stores information for application 100. Database 115 can be local or remote relative to application 100. Database 115 can be queried using pagination techniques. Authorization service 120 is a service that enforces policy for each item that is pulled from the database 115.

As used herein, the term "service" refers to an automated program that is tasked with performing different actions based on input. In some cases, service 110 can be a deterministic service that operates fully given a set of inputs and without a randomization factor. In other cases, service 110 can be or can include a machine learning (ML) or artificial intelligence engine. The ML engine enables service 110 to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 110 is a cloud service operating in a cloud environment. In some implementations, service 110 is a local service operating on a local device. In some implementations, service 110 is a hybrid service that includes a cloud component operating in the cloud and a local component operating on a local device. These two components can communicate with one another. In some cases, service 110 can operate in a virtualized environment, such as a virtual machine or a container. Thus, in some cases, service 110 operates in a cloud based environment and in other cases service 110 operates in a virtualized environment.

In one example scenario, controller 105 may trigger a request to obtain information via a query, as shown by get collection 125. That query may include search parameters for items that are of interest and that are desired to be obtained. In response, service 110 may submit a query 130 to the database 115, where that query 130 includes the various search parameters. Execution of the query 130 against database 115 results in a number of items being returned in accordance with pagination techniques, as shown by page i 135. For instance, 100 items may be returned, and those 100 items may be organized across 10 different pages. Thus, each page includes 10 different query results.

Next, according to the processes described earlier, service 110 submits an authorization request for each item that was returned from the query, as shown by authorization for each item 140. For instance, each page includes 10 items, and an authorization request is submitted to the authorization service 120 for each of those 10 items in each of the pages (perhaps one page at a time). Each page of results (and each result in each page) will be individually processed and analyzed by the authorization service 120.

This authorization request is sent to the authorization service 120, as shown by authorization for each item 140. Authorization service 120 will review each item, apply its policy, and determine whether each item is granted or denied. The granted items 145 are then returned to the controller 105 while still following the pagination techniques.

For instance, in this example, suppose 10 items were originally returned as a part of a first page. Ten authorization requests were submitted to the authorization service 120 for that first page of 10 items. In this example, authorization service 120 granted only 3 items, however. As a result, the items 145 include only 3 items, and the first page that is provided to the requester will include only those 3 items. That is, those 3 items will be displayed in a single page for the application 100. Thus, whereas this single page could have displayed a total of 10 results, it is now displaying only a total of 3 results. As a result, the displayed page is not being utilized to its fullest potential and is missing content.

In the above example, application 100 and authorization service 120 are tasked with applying or enforcing policy at a single item level as opposed to at a collection level. That is, the application 100 works with the authorization service 120 to enforce policy for each individual item as opposed to a collection grant or denial of authorization. The result of performing this single item level enforcement technique is that pages may displayed, but those pages may be underutilized. What is needed, therefore, is an improved technique for better utilizing pages and for enforcing policy at a collection level.

Improved Architecture(s)

Figure 2:
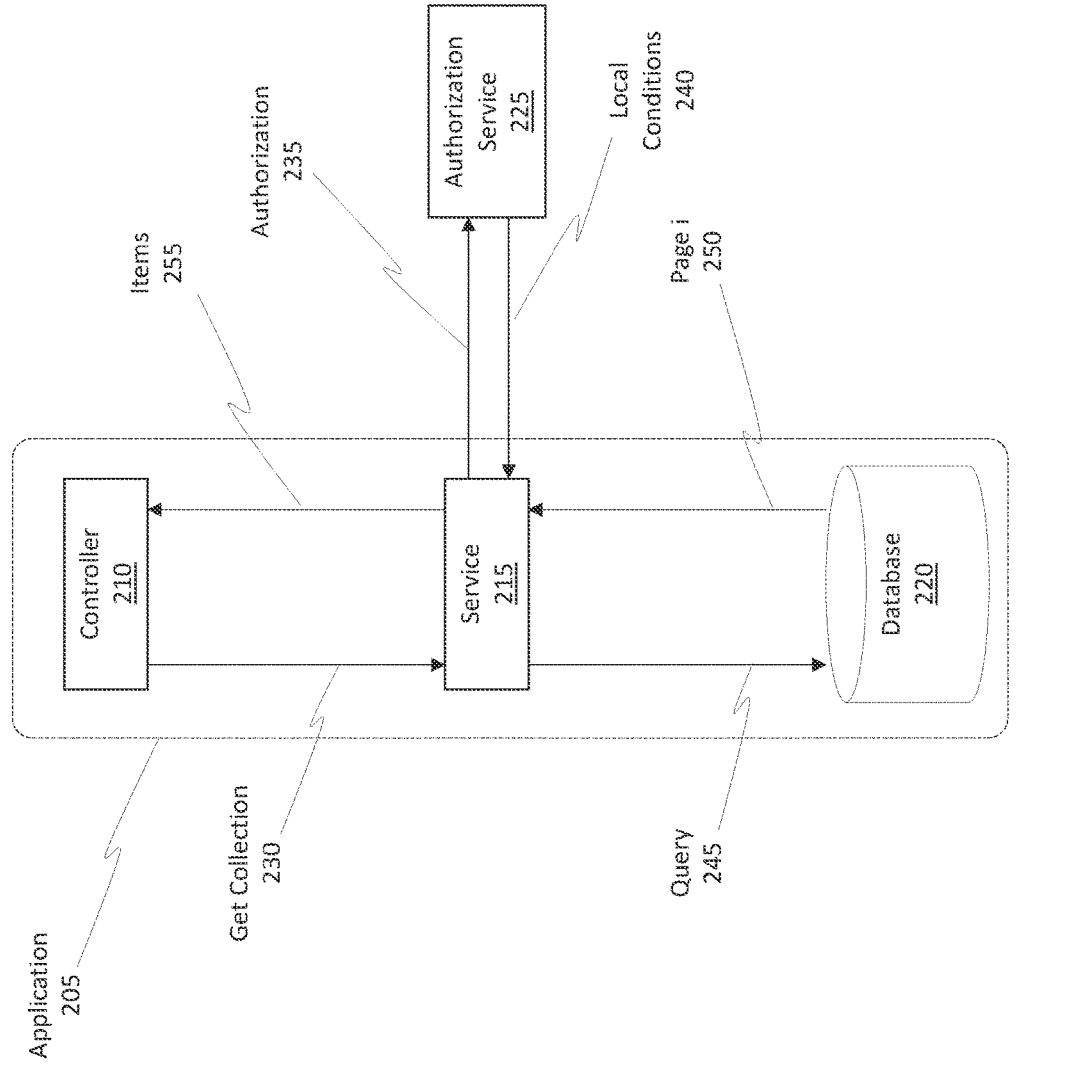
FIG. 2 illustrates an example architecture for enforcing policy at a collection level.

Having just outlined some of the problems with enforcing policy at a single item level, attention will now be directed to FIG. 2, which illustrates an example architecture 200 in which the disclosed principles may be employed. Architecture 200 includes an application 205. Application 205 includes a controller 210, a service 215, and a database 220, similar to how application 100 of FIG. 1 was configured. Application 205 communicates with authorization service 225. Whereas application 100 and authorization service 120 of FIG. 1 were configured to enforce policy at a per item or per result level, application 205 and authorization service 225 are configured to enforce policy at a collection level, thereby improving how results are displayed using pages.

Generally, architecture 200 is designed to introduce an offline authorization evaluation request that evaluates part of the policy in the authorization service (PDP) 225 and part of the policy in the service level ("offline") (i.e. service 215). The embodiments beneficially store the attributes (e.g., metadata) of the resources in the database so that downstream the query can include the additional conditions (as determined by policy) of the access control and can pull only the items that the user is permitted access to (per the policy).

Generally, the process is as follows. A user/client requests to view a page of items. The embodiments perform an authorization call to authorization service 225, and the call includes the initial request parameters. The access is granted but with specific conditions (generated based on the selected policy). The query to the database is tailored to take in account the conditions. The database will return one or more pages with filtered information based on the original query and the filtering conditions. FIG. 2 is illustrative.

For example, controller 210 may trigger a request to obtain information via a query, as shown by get collection 230. That query may include search parameters for items that are of interest and that are desired to be obtained. In response, service 215 submits an authorization request to the authorization service 225, as shown by authorization service 235. The request includes the initial search request parameters as well as characteristics associated with the requestor (e.g., potentially age, location, user type, etc.). Authorization service 235 analyzes the request and generates a set of local conditions 240 (based on a selected policy that is applicable to the requestor) that are to be injected as parameters of the query that will be sent to the database 220.

Service 215 receives the local conditions 240 and prepares the query 245 using those local conditions 240 as well as the original search parameters. The query 245 is then executed against the database 220.

Execution of the query 245 against database 220 results in a number of items being returned in accordance with pagination techniques, as shown by page i 250. The resulting items 255 are then displayed in accordance with the pagination techniques.

For instance, 100 items may be returned, and those 100 items may be organized across 10 different pages. All 100 of those items satisfy the policy and the local conditions. Each page is structured to include 10 different query results.

In this scenario, as mentioned above, each of the 100 items has been selected so as to satisfy the local conditions 240 as well as the original search parameters. As a result, the pages are fully utilized. For instance, if each page can display 10 items, and if 100 items were returned, then each page will be fully populated.

If, on the other hand, 95 items were returned, then the first 9 pages will be fully populated, and the tenth page will have five results. Such an output is different than the output that was generated using the scenario presented in FIG. 1 because in the previous scenario even the first page may be underutilized. In contrast, if N number of pages are generated according to the disclosed principles, pages 1 through N−1 will be fully populated and only page N might be partially populated.

In this manner, the implementation of the policy can be performed using the local conditions 240 that are injected as parameters to the queries submitted to the database 220. The results of the queries will satisfy the policy because of the use of the local conditions 240. Furthermore, the pages will be better utilized as compared to the earlier technique. The policy is implemented once by the authorization service 225 by generating the local conditions. Those local conditions are then executed by the service via the query. Thus, service 215 assists in executing the policy as well.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Attention will now be directed to FIG. 3, which illustrates a flowchart of an example method 300 for enforcing policy at a collection level as opposed to a per-result level. Method 300 can be implemented within architecture 200 of FIG. 2. Also, method 300 can be performed by service 215.

Method 300 includes an act (act 305) of receiving, from a requesting entity, a set of search parameters to query a database of information. The requesting entity may be any entity, including any type of user, service, computer system, and so on, without limit.

Act 310 includes sending the set of search parameters to an authorization service. The authorization service is tasked with enforcing a collection level policy for the requesting entity. This enforcement is performed by the authorization service generating a set of local conditions that are injectable into a query submitted to the database. The local conditions are generated based on policy that is selected for the requesting entity.

Act 315 includes receiving, from the authorization service, the set of local conditions. In some implementations, the set of local conditions includes an age restriction search parameter, a geographic location search parameter, a user type search parameter, or a local regulation search parameter. Of course, other location conditions can be generated as well. For instance, the local conditions may include timing restrictions, such as a freshness for data (e.g., data that has been generated within the past "X" number of hours, days, months, or years). The local conditions can specify when the query is permitted to be executed. For instance, the local conditions may state that the query is executable only during a specific time period. Outside of that time period, the query may not be executable. The local conditions may restrict which databases or which subsets of data can be queried. Accordingly, the local conditions may include any criteria or any condition.

Act 320 includes generating the query using a combination of the set of search parameters and the set of local conditions. As a result, the set of local conditions are added to the query as additional parameters, criteria, or requirements for the query. When the query is executed, the set of local conditions operate as filtering parameters to limit the results.

Act 325 includes facilitating execution of the query against the database. Optionally, service 215 may execute the query. As another option, service 215 may send the query to another computing entity, and that computing entity may execute the query and then return the results to service 215.

Act 330 includes returning results of the executed query to the requesting entity. In some implementations, the results are organized using pages. As various examples, at least a first page is fully populated with some of the results. Furthermore, in some cases, a second page is also fully populated with some additional ones of the results. In some cases, the results populate at least three pages, and at least two of the at least three pages are fully populated using some of the results. Stated differently, a first page may be fully populated with a first set of the results, and a second page may be fully populated with a second set of the results. Optionally, a third page is partially populated with a third set of the results. More generally, the pages include N number of pages. Pages 1 through N−1 are fully populated with corresponding sets of the results, and page N is partially populated with a final set of the results. Thus, in contrast with traditional scenarios in which even the first page might be underutilized, the disclosed embodiments better utilize pagination by enabling pages to be better populated with data.

By performing the disclosed operations, enforcement of the collection level policy by the authorization service may be performed a single time and is applicable to all of the results that are subsequently obtained from executing a query. Beneficially, the enforcement of the collection level policy by the authorization service is performed prior to execution (or perhaps even the generation) of the query. Also, the enforcement of the collection level policy by the authorization service is performed prior to execution (and generation) of the query and subsequent to receipt of the set of search parameters. The enforcement of the collection level policy is performed as a result of generating the set of location conditions, which are then included as a part of the query. Thus, the enforcement of the collection level policy occurs as a result of the query being generated in a manner to include the set of local conditions. Both the authentication service and the application's service assist in enforcing the policy at a collection level.

Example Computer Systems

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. Also, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, client, engine, agent, services, and component are examples of terms that may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
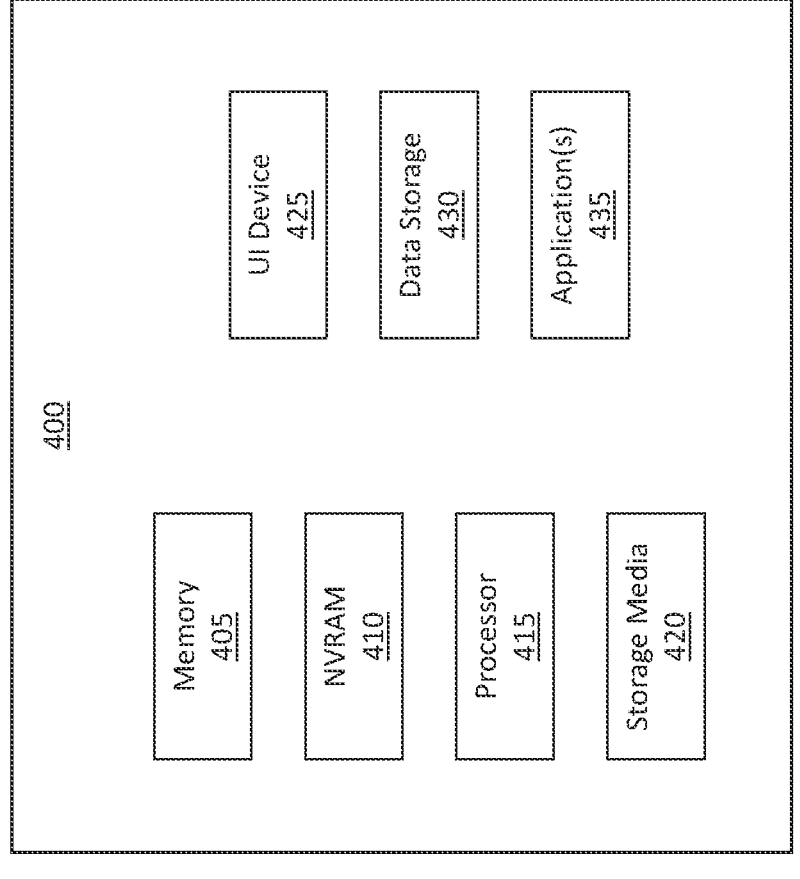
FIG. 4 illustrates an example computer system that can be configured to perform any of the disclosed operations.

With reference briefly now to FIG. 4, any one or more of the entities disclosed, or implied, by the Figures and/or elsewhere herein, may take the form of, or include, or be implemented on, or hosted by, a physical computing device, one example of which is denoted at 400. Also, where any of the aforementioned elements comprise or consist of a virtual machine (VM), that VM may constitute a virtualization of any combination of the physical components disclosed in FIG. 4. The computing device shown at 400 can implement the application 205 and/or the authorization service 225.

In the example of FIG. 4, the physical computing device 400 includes a memory 405 which may include one, some, or all, of random access memory (RAM), non-volatile memory (NVM) 410 such as NVRAM for example, read-only memory (ROM), and persistent memory, one or more hardware processors 415, non-transitory storage media 420, UI device 425, and data storage 430. One or more of the memory 405 of the physical computing device 400 may take the form of solid-state device (SSD) storage. Also, one or more applications 435 may be provided that comprise instructions executable by one or more hardware processors 415 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein. The physical device 400 may also be representative of an edge system, a cloud-based system, a datacenter or portion thereof, or other system or entity.

The disclosed embodiments can be implemented in numerous different ways, as described in the various different clauses recited below.

Clause 1. A method comprising: receiving, from a requesting entity, a set of search parameters to query a database of information; sending the set of search parameters to an authorization service, which is tasked with enforcing a collection level policy for the requesting entity by generating a set of local conditions that are injectable into a query submitted to the database; receiving, from the authorization service, the set of local conditions; generating the query using a combination of the set of search parameters and the set of local conditions; executing the query against the database; and returning results of the executed query to the requesting entity, wherein the results are organized using pages.

Clause 2. The method of any of the preceding clauses, wherein at least a first page of said pages is fully populated with some of the results.

Clause 3. The method of any of the preceding clauses, wherein a second page of said pages is also fully populated with some additional ones of the results.

Clause 4. The method of any of the preceding clauses, wherein the set of local conditions includes an age restriction search parameter.

Clause 5. The method of any of the preceding clauses, wherein the set of local conditions includes a geographic location search parameter.

Clause 6. The method of any of the preceding clauses, wherein the set of local conditions includes a user type search parameter.

Clause 7. The method of any of the preceding clauses, wherein the set of local conditions includes local regulation search parameter.

Clause 8. The method of any of the preceding clauses, wherein enforcement of the collection level policy by the authorization service is performed a single time and is applicable to all of the results obtained from executing the query.

Clause 9. The method of any of the preceding clauses, wherein enforcement of the collection level policy by the authorization service is performed prior to execution of the query.

Clause 10. The method of any of the preceding clauses, wherein enforcement of the collection level policy by the authorization service is performed prior to execution of the query and subsequent to receipt of the set of search parameters.

Clause 11. A computer system comprising: one or more processors; and one or more hardware storage devices that store instructions that are executable by the one or more processors to cause the computer system to: receive, from a requesting entity, a set of search parameters to query a database of information; send the set of search parameters to an authorization service, which is tasked with enforcing a collection level policy for the requesting entity by generating a set of local conditions that are injectable into a query submitted to the database; receive, from the authorization service, the set of local conditions; generate the query using a combination of the set of search parameters and the set of local conditions; execute the query against the database; and return results of the executed query to the requesting entity, wherein the results are organized using pages.

Clause 12. The computer system of any of the preceding clauses, wherein the set of local conditions include at least one of: an age restriction search parameter, a geographic location search parameter, a user type search parameter, or a local regulation search parameter.

Clause 13. The computer system of any of the preceding clauses, wherein enforcement of the collection level policy by the authorization service is performed prior to execution of the query.

Clause 14. The computer system of any of the preceding clauses, wherein enforcement of the collection level policy is performed as a result of including the set of local conditions as a part of the query.

Clause 15. The computer system of any of the preceding clauses, wherein the results populate at least three pages, and wherein at least two of the at least three pages are fully populated using some of the results.

Clause 16. The computer system of any of the preceding clauses, wherein enforcement of the collection level policy occurs as a result of the query being generated in a manner to include the set of local conditions.

Clause 17. The computer system of any of the preceding clauses, wherein a first page of said pages is fully populated with a first set of the results, and wherein a second page of said pages is fully populated with a second set of the results.

Clause 18. The computer system of any of the preceding clauses, wherein a third page of said pages is partially populated with a third set of the results.

Clause 19. One or more hardware storage devices that store instructions that are executable by one or more processors to cause the one or more processors to: receive, from a requesting entity, a set of search parameters to query a database of information; send the set of search parameters to an authorization service, which is tasked with enforcing a collection level policy for the requesting entity by generating a set of local conditions that are injectable into a query submitted to the database; receive, from the authorization service, the set of local conditions; generate the query using a combination of the set of search parameters and the set of local conditions; execute the query against the database; and return results of the executed query to the requesting entity, wherein the results are organized using pages.

Clause 20. The one or more hardware storage devices of any of the preceding clauses, wherein the pages include N number of pages, and wherein pages 1 through N−1 are fully populated with corresponding sets of the results, and wherein page N is partially populated with a final set of the results.

The described embodiments are to be considered in all respects only as illustrative and not restrictive. All changes which come within the meaning and range of equivalency of the claims are to be embraced within their scope.

What is claimed is:

1. A method comprising:
   receiving, from a requesting entity, a set of search parameters to query a database of information;
   sending the set of search parameters to an authorization service, the authorization service being operative to perform a portion of a policy evaluation and to dynamically generate, based on a selected policy, user attributes, and contextual information, a conditions structure that is expressly coupled to the evaluated policy and is separate from an access control mechanism, the authorization service being tasked with enforcing a collection level policy for the requesting entity by generating a set of local conditions that: (i) reference metadata or attributes stored in the database; (ii) are applicable to the result set as a whole; and (iii) are formatted for direct injection into a database query so that the database enforces the remainder of the policy during query execution;
   receiving, from the authorization service, the set of local conditions;
   generating the query using a combination of the set of search parameters and the set of local conditions;
   executing the query against the database; and
   returning results of the executed query to the requesting entity, wherein the results are organized using pages, wherein the local conditions are incorporated prior to query execution such that only items satisfying the policy-coupled conditions structure are retrieved from the database, thereby enabling pages 1 through N−1 of an N-page result set to be fully populated, wherein the local conditions are applied only once prior to query execution and govern inclusion of any result in the returned result set, without evaluating each result individually.

2. The method of claim 1, wherein at least a first page of said pages is fully populated with some of the results.

3. The method of claim 2, wherein a second page of said pages is also fully populated with some additional ones of the results.

4. The method of claim 1, wherein the set of local conditions includes an age restriction search parameter.

5. The method of claim 1, wherein the set of local conditions includes a geographic location search parameter.

6. The method of claim 1, wherein the set of local conditions includes a user type search parameter.

7. The method of claim 1, wherein the set of local conditions includes local regulation search parameter.

8. The method of claim 1, wherein enforcement of the collection level policy by the authorization service is performed a single time and is applicable to all of the results obtained from executing the query.

9. The method of claim 1, wherein enforcement of the collection level policy by the authorization service is performed prior to execution of the query or, alternatively, is performed prior to generation of the query.

10. The method of claim 1, wherein enforcement of the collection level policy by the authorization service is performed prior to execution of the query and subsequent to receipt of the set of search parameters.

11. A computer system comprising:

one or more processors; and one or more hardware storage devices that store instructions that are executable by the one or more processors to cause the computer system to:

receive, from a requesting entity, a set of search parameters to query a database of information;

send the set of search parameters to an authorization service that performs a first portion of a multi-stage policy evaluation and dynamically generates a policy-coupled conditions structure based on the selected policy, user attributes, and contextual information, the authorization service being tasked with enforcing a collection level policy for the requesting entity by determining local conditions that reference metadata stored in the database and are formatted to be directly injected into the query so that the database enforces the remaining portion of the policy during query execution;

receive, from the authorization service, the set of local conditions;

generate the query using a combination of the set of search parameters and the set of local conditions;

execute the query against the database; and return results of the executed query to the requesting entity, wherein the results are organized using pages, wherein the incorporation of the policy-coupled conditions structure into the query causes only policy-compliant items to be retrieved such that at least pages 1 through N−1 of an N-page result set are fully populated, wherein the local conditions are incorporated prior to query execution and govern eligibility for inclusion of data in the result set in bulk.

12. The computer system of claim 11, wherein the set of local conditions include at least one of: an age restriction search parameter, a geographic location search parameter, a user type search parameter, or a local regulation search parameter.

13. The computer system of claim 11, wherein enforcement of the collection level policy by the authorization service is performed prior to generation of the query.

14. The computer system of claim 11, wherein enforcement of the collection level policy is performed as a result of including the set of local conditions as a part of the query.

15. The computer system of claim 11, wherein the results populate at least three pages, and wherein at least two of the at least three pages are fully populated using some of the results.

16. The computer system of claim 11, wherein enforcement of the collection level policy occurs as a result of the query being generated in a manner to include the set of local conditions.

17. The computer system of claim 11, wherein a first page of said pages is fully populated with a first set of the results, and wherein a second page of said pages is fully populated with a second set of the results.

18. The computer system of claim 17, wherein a third page of said pages is partially populated with a third set of the results.

19. One or more hardware storage devices that store instructions that are executable by one or more processors to cause the one or more processors to:

receive, from a requesting entity, a set of search parameters to query a database of information;

send the set of search parameters to an authorization service, the authorization service being configured to enforce a collection level policy for the requesting entity by performing a portion of the policy evaluation and generating a policy-coupled conditions structure that references database-resident metadata and is dynamically derived from the selected policy, user attributes, and contextual information, the conditions structure being configured to derive and return a set of local conditions applicable to the full result set, rather than the individual results;

receive, from the authorization service, the set of local conditions;

generate the query using a combination of the set of search parameters and the set of local conditions;

execute the query against the database; and return results of the executed query to the requesting entity, wherein the results are organized using pages, wherein incorporation of the policy-coupled local conditions into the query causes the database to apply the remaining portion of the policy prior to returning any items, thereby ensuring that pages 1 through N−1 of an N-page result set are fully populated, and wherein application of the collection-level policy occurs a single time prior to query execution and is not repeated for each result item.

20. The one or more hardware storage devices of claim 19, wherein the pages include N number of pages, and wherein pages 1 through N−1 are fully populated with corresponding sets of the results, and wherein page N is partially populated with a final set of the results.

* * * * *